United States Patent
Raghavendran

(10) Patent No.: US 7,972,685 B2
(45) Date of Patent: *Jul. 5, 2011

(54) GLASS MAT LAMINATE COMPRISED OF POLYMERIZABLE CYCLIC POLYESTER OLIGOMERS SUITABLE FOR COMPOSITES WITH A CLASS-A SURFACE

(75) Inventor: Venkat K. Raghavendran, Forest, VA (US)

(73) Assignee: Azdel, Inc., Forest, VA (US)

( * ) Notice: Subject to any disclaimer, the term of this patent is extended or adjusted under 35 U.S.C. 154(b) by 1175 days.

This patent is subject to a terminal disclaimer.

(21) Appl. No.: 11/141,238

(22) Filed: May 31, 2005

(65) Prior Publication Data

US 2005/0228108 A1 Oct. 13, 2005

Related U.S. Application Data

(63) Continuation-in-part of application No. 10/696,869, filed on Oct. 30, 2003, now abandoned.

(51) Int. Cl.
*B32B 27/04* (2006.01)
(52) U.S. Cl. ............... 428/297.4; 428/298.1; 428/299.4; 428/298.7
(58) Field of Classification Search .................. None
See application file for complete search history.

(56) References Cited

U.S. PATENT DOCUMENTS

| | | | |
|---|---|---|---|
| 4,612,238 A | 9/1986 | Della Vecchia | |
| 4,983,247 A | 1/1991 | Kim | |
| 5,464,585 A | 11/1995 | Fitzgibbon | |
| 6,369,157 B1 | 4/2002 | Winckler et al. | |

*Primary Examiner* — Jill Gray
(74) *Attorney, Agent, or Firm* — Clements Bernard PLLC; Gregory N. Clements

(57) ABSTRACT

A composition of a fiber reinforced multi-layered laminate that when compression-molded forms a composite having a Class-A surface that is resin rich. The fiber reinforced multi-layered laminate has an outer layer of a cyclic polyester oligomer containing a latent polymerization catalyst; a glass mat; a core layer of a cyclic polyester oligomer containing a latent polymerization catalyst; a second glass mat, and another outer layer of a cyclic polyester oligomer containing a latent polymerization catalyst. When compression molded, the combination of heat and pressure force the core layer through the permeable glass mats and toward the surface. The latent polymerization catalyst initiates polymerization of the cyclic polyester oligomer forming a Class-A surface that is resin rich. The core layer of a cyclic polyester oligomer thoroughly permeates the reinforcing fiber forming a composite having a middle, with a nearly uniform mixture of reinforced glass fiber and thermoplastic in situ polymerized resin.

9 Claims, 2 Drawing Sheets

GLASS MAT LAMINATE COMPRISED OF POLYMERIZABLE CYCLIC POLYESTER OLIGOMERS SUITABLE FOR COMPOSITES WITH A CLASS-A SURFACE

CROSS REFERENCE TO RELATED APPLICATIONS

The application is a continuation-in-part of a currently pending patent application, which was filed on Oct. 30, 2003, and bears the Ser. No. 10/696,869 now abandoned.

FIELD OF THE INVENTION

The present invention relates to a glass mat thermoplastic (GMT) composite, and more particularly to glass mat laminate that can be facilely converted in a B-stage operation to a composite having a Class-A surface, wherein the composite is comprised of polymerized macrocyclic polyester oligomers.

It is to be understood that the foregoing description and specific embodiments are merely illustrative of the best mode of the invention and the principles thereof, and that various modifications and additions may be ma de to the apparatus by those skilled in the art, without departing from the spirit and scope of this invention, which is therefore understood to be limited only by the scope of the appended claims.

BACKGROUND OF THE INVENTION

There is a growing demand by industry, governmental regulatory agencies and consumers for durable and inexpensive products that are functionally comparable or superior to metal products. This is particularly true in the automotive industry. Developers and manufacturers of these products are concerned with the strength parameters, such as impact, bending, stretching, and twisting resilience. To meet these demands, a number of composite materials have been engineered. A relatively inexpensive product is GMT composite. GMT composites can be molded and stamped into a variety of suitable products, most notably are bumpers. Previous known GMT products do not have sufficient surface qualities to be used in visible applications on automobiles, such as body panels. The quality of finish suitable for painting is designated a Class-A surface. Currently, only sheet molded compounds (SMCs) are used on visible, painted automobile body components. SMCs are substantially more expensive than GMT fabricated parts, and generate a lot of scrap. What is needed is a GMT that has a Class-A surface that can be used in visible, painted parts. Furthermore, what is desired is a GMT composite that is impregnated with a low viscosity thermoplastic resin that has a latent polymerization catalyst, where in a B-stage process step, such as heated molding and stamping, the polymerization catalyst initiates conversion of the low viscosity thermoplastic resin to a polymerized material. The resulting composite should have the strength parameters, such as impact, bending, stretching, and twisting resilience, as well as the Class-A finish.

A review of the prior art follows:

DESCRIPTION OF THE PRIOR ART

Applicant is aware of the following U.S. Patents.

| U.S. Pat. No. | Inventor | Issue Date | Title |
| --- | --- | --- | --- |
| 4,983,247 | Kim | Jan. 8, 1991 | METHOD FOR PRODUCING RESIN RICH SURFACE LAYER ON COMPOSITE THERMOPLASTIC MATERIAL |
| 5,464,585 | Fitzgibbon | Nov. 7, 1995 | METHOD OF INJECTION MOLDING ARTICLES WITH SELECTIVE CONCENTRATIONS OR GRADIENTS OF MATERIALS |
| 4,612,238 | Della Vecchia | Sep. 16, 1986 | FIBER REINFORCED MULTI-PLY STAMPABLE THERMOPLASTIC SHEET |
| 6,369,157 | Winckler et al. | Apr. 9, 2002 | BLEND MATERIAL INCLUDING MACROCYCLIC POLYESTER OLIGOMERS AND PROCESSES FOR POLYMERIZING THE SAME |

Kim, in U.S. Pat. No. 4,983,247, teaches a method for making a fiber-reinforced composite having a resin rich first layer on the surface. Forming a fiber free layer of a thermoplastic resin, heating a composite bulk layer of resin and reinforcing fibers, and then compressing the first layer and the composite bulk layer, so that the heat from the bulk layer causes the first layer to melt.

Fitzgibbon, in U.S. Pat. No. 5,464,585, teaches a method where a resin-modifying auxiliary material is concentrated in the surface portion of an article. The method is particularly suited to RIM (reaction injection molding). In the process the mold is filled with a gradient of a bulk material and an auxiliary material, where the auxiliary material is generally defined as producing superior results as a mold surface material. The ratio is varied with time, so that as the mold is filled there is less of the auxiliary material. Cited along with resin-modifying auxiliary materials are a catalyst and catalyst/initiator for polymerization, wherein they are concentrated at the surface of the mold.

Della Vecchia et al., in U.S. Pat. No. 4,612,238, discloses a process for producing a laminate that combines a layer of resin, a glass mat, another layer of resin, a second glass mat, and a third layer of resin. The first and third layers of resin, which are thermoplastic materials, can be selected so as to obtain the desired properties. Various quantities of reinforcing materials, fillers, and additives can be in selected proportions.

Winckler et al., in U.S. Pat. No. 6,369,157, teaches that a blend of a macrocyclic polyester oligomer and a polymerization catalyst as a one component ready-to-use material enables production of parts from macrocyclic polyester oligomers without the modification of existing equipment, thereby reducing time and cost of manufacture, while expanding the application of macrocyclic polyester oligomers. In this blend material, the macrocyclic polyester oligomer remains intact in solid state at ambient conditions. Upon melting, the blend material initially forms low viscosity fluid, and then rapidly polymerizes to form high molecular weight polyesters, which subsequently solidify to form crystalline polymers. In the case of certain macrocyclic polyester oligomers, for example, poly(1,4-butylene terephthalate), demolding can take place at the polymerization temperature, e.g., at about 180° C. to 200° C., because the resulting polyester polymer solidifies fairly rapidly at that temperature without cooling. In one aspect, the invention generally features a blend material that includes a macrocyclic polyester oligomer, a polymerization catalyst and, optionally, a filler. In another aspect, the invention generally features a process for preparing a blend material. In yet another aspect, the invention features processes such as rotational molding, resin film infusion, pultrusion, resin transfer molding, filament winding, making and using powder-coated or hot melt prepreg, compression molding, and roll wrapping, which use the blend material.

SUMMARY OF THE INVENTION

The invention is fiber reinforced laminate and a method for forming a fiber reinforced laminate that, upon processing with heat and compression, forms a composite with a Class-A surface. The fiber reinforced laminate is comprised of: a) an extruded layer comprised of a cyclic polyester oligomer containing a latent polymerization catalyst; and b) a permeable layer of reinforcing fibers. The latent polymerization catalyst is activated when exposed to temperatures in excess of 200° C. Activation initiates the polymerization of the cyclic polyester oligomer. The cyclic polyester oligomer can react with another cyclic polyester oligomer or an acyclic polyester oligomer, or a polyester polymer. Reactive compounds, like a functionalized monomer, dimer, trimer or tetramer, can be added to increase cross-linking, serve as a reactive diluent, and enhance penetration. The functional group typically either reacts with a carboxyl group or a hydroxyl group. Examples of reactive functional groups are esters, epoxies, anhydrides, lactones, and blocked isocyanates. Generally, diacid chlorides are not preferred because they produce undesirable reaction by-products. Polyester polymers can be admixed with the cyclic polyester oligomer to increase viscosity and molecular weight. The cyclic polyester and latent polymerization catalyst are selected so that at the activation temperatures, the cyclic polyester oligomer will flow, polymerize, and impregnate the permeable layers of reinforcing fiber. In a compression mold, the polymerizing cyclic polyester oligomer forms a resin rich layer against the surface of the mold, and produces a Class-A surface that is comparable to an SMC material. The latent polymerization catalyst is preferably selected from the group consisting of an organotin compound and an organotitanate compound. Tertiary amines are frequently used in combination with organotin compounds. Cyclic polyester oligomers include the class of cyclic esters that are also known as macropolyester oligomers, where a macropolyester oligomer has 8 or more atoms in the ring. Cyclic polyester oligomers are selected from the group consisting of cyclic poly(1,4-butylene terephthalate) (CPBT), poly(1,3-propylene terephthalate) (CPPT), poly(1,4-cyclohexylenedimethylene terephthalate) (CPCT), poly(ethylene terephthalate) (CPET), and poly(1,2-ethylene 2,6-naphthalenedicarboxylate) (CPEN) oligomers, and copolyester oligomers comprising two or more of the above monomer repeat units. The cyclic polyester oligomers typically also contains a percentage of non-cyclic polyester oligomers, such as poly(1,4-butylene terephthalate) (PBT), poly(1,3-propylene terephthalate) (PPT), poly(1,4-cyclohexylenedimethylene terephthalate) (PCT), poly(ethylene terephthalate) (PET), and poly(1,2-ethylene 2,6-naphthalenedicarboxylate) (PEN), polycaprolactone (PCL), and copolyester oligomers comprising two or more of the above monomer repeat units.

The composition advantageously includes additives selected from the group consisting of extender fillers, reinforcing fillers, antioxidants, UV stabilizers, thermal stabilizers, flame retardants, desiccants, buffers, glass beads, colorants, antimicrobial agents, dyes, bluing agents, fluorescing agents, pigments, plasticizers, oils, impact modifiers, processing aides (i.e. waxes, fluorinated compounds, silicone compounds, surfactants, polymeric processing aides), density modifiers, such as phenolic beads and micro-balloons, crushed stone, fumed silica, titanium dioxide, calcium carbonate, fly ash, talc, clay, carbon blacks, graphite, Wollastonite, and IR absorbent compounds to facilitate heating (i.e., metal oxides). It has been found that some extenders, such as calcium carbonate and talc, can be added with minimal deleterious effect to the Izod Impact resistance.

The cyclic polyester oligomer, and in particular poly(1,4-butylene terephthalate), can be extruded at much lower viscosities than are normally obtainable with traditional polyester resins. Penetration of the permeable layer of reinforcing fibers is far superior. It is hypothesized that the lower viscosity and enhanced saturation performance is attributable to not only the molecular weight, but to the cyclic geometry of the oligomer. By way of example, CPBT resins are solid at room temperature, and when heated are fully molten above 160° C. (320° F.), with a viscosity in the range of 150 mPa·s (150cP). They drop in viscosity to below 20 mPa·s (20cP) at 180° C. (355° F.). This initial water-like viscosity allows rapid and excellent wet-out of fillers and fiber reinforcements, along with the ability to mold at very low pressures. The cyclic geometry does not appear to disrupt cyrstallinity, especially with CPBT, as it has a rather sharp melting point in the range of 160° C.; and, as previously stated, demolding can take place quickly because the resulting polyester polymer solidifies rapidly. There is no need to cool the mold as within a particular temperature range CPBT resins melt, flow, polymerize, and then solidify sufficiently for part removal, without cooling the mold. This is because the CPBT resin reaction can take place at approximately 180° C. (355° F.), which is much below the 220° C. (430° F.) melt temperature of the final thermoplastic PBT composite. Once the composite is polymerized it starts to crystallize immediately to become a solid semi-crystalline thermoplastic. Also, there is substantially no heat released during the reaction that converts CPBT resins to PBT thermoplastic. The reaction cannot take off and lead to uncontrolled temperature increases that can damage parts in the mold. Cycle times can be greatly reduced in large parts where thick walled sections currently pose a threat of burning, unless processed slowly and carefully. When mixed with polymerization catalysts the CPBT cyclic rings open and connect (i.e., polymerize) to form a high molecular weight PBT thermoplastic. Full polymerization can occur in 10's of seconds or many minutes depending on the temperature and type of catalyst used. The combination of low viscosity and rapid polymerization allows for fast processing in many different applications. CPBT resins do not off-gas while processing; no styrene or other VOC's (Volatile Organic Compounds) are released during the polymerization reaction. As the EPA (Environmental Protection Agency) and European agencies continue to restrict the amount of styrene emissions that can be released by parts manufacturers of such products as ladder rails, boats and automotive body panels, the elimination of off-gassing becomes a significant advantage. The lack of off-gassing also reduces the void content, promotes better surface finish, and lowers cost by eliminating regulatory and compliance cost.

A composite having a Class-A surface is typically a multilayered laminate comprised of a pair of outer layers (i.e., a first and a third layer) of extruded cyclic polyester oligomer containing a latent polymerization catalyst coated on two (i.e., a first and a second layer) permeable layers of reinforcing fibers. The first and the second permeable layers of reinforcing fibers have a core (i.e., a second) layer of extruded cyclic polyester oligomer containing a latent polymerization catalyst. The laminate is pressurized and cooled. In B-stage processing, the laminate is converted into the composite. An appropriate size of the laminate is heated and compressed in a mold causing the cyclic polyester oligomer to melt and flow, therein saturating the reinforcing fiber layers. The latent polymerization catalyst initiates/catalyzes the polymerization. The oligomeric esters, compounded with the desired additives, thoroughly permeate the reinforcing fibers forming a composite with a nearly uniform mixture of reinforced fibers and polymerized cyclic polyester. The surface of the composite is resin rich, like a gel coat, comprised substantially of the newly polymerized polyester resin. The finish of the surface coating substantially replicates the face of the mold or compression plate.

In this respect, before explaining at least one embodiment of the invention in detail, it is to be understood that the invention is not limited in its application to the detailed construction and to the arrangements of the components set forth in the following description illustrated in the drawings. The invention is capable of other embodiments and of being practiced and carried out in various ways. Also, it is to be understood that the phraseology and terminology employed herein are for the purpose of the description and should not be regarded as limiting.

OBJECTS OF THE INVENTION

The principal object of the present invention is to provide an improved composition for forming a fiber reinforced laminate that can be processed in a composite a Class-A surface.

A further object of this invention is to provide an improved laminate for forming a fiber reinforced composite, wherein the fibers of the composite are more thoroughly saturated.

A further object of this invention is to provide a composition for a fiber reinforced composite material, wherein the core of the composite is comprised of polymer that is integrally admixed with the reinforcing fibers.

Another object of the invention is to provide an improved composition for a GMT composite, wherein parts fabricated from a GMT composite can either be in-mold coated or painted in subsequent steps for use in exterior body panel applications in automotive and transportation markets.

Another object is to provide a method for making an improved GMT composite having a Class-A surface.

BRIEF DESCRIPTION OF THE DRAWINGS

The foregoing and other objects will become more readily apparent by referring to the following detailed description and the appended drawings in which.

DETAILED DESCRIPTION

Figure 1:
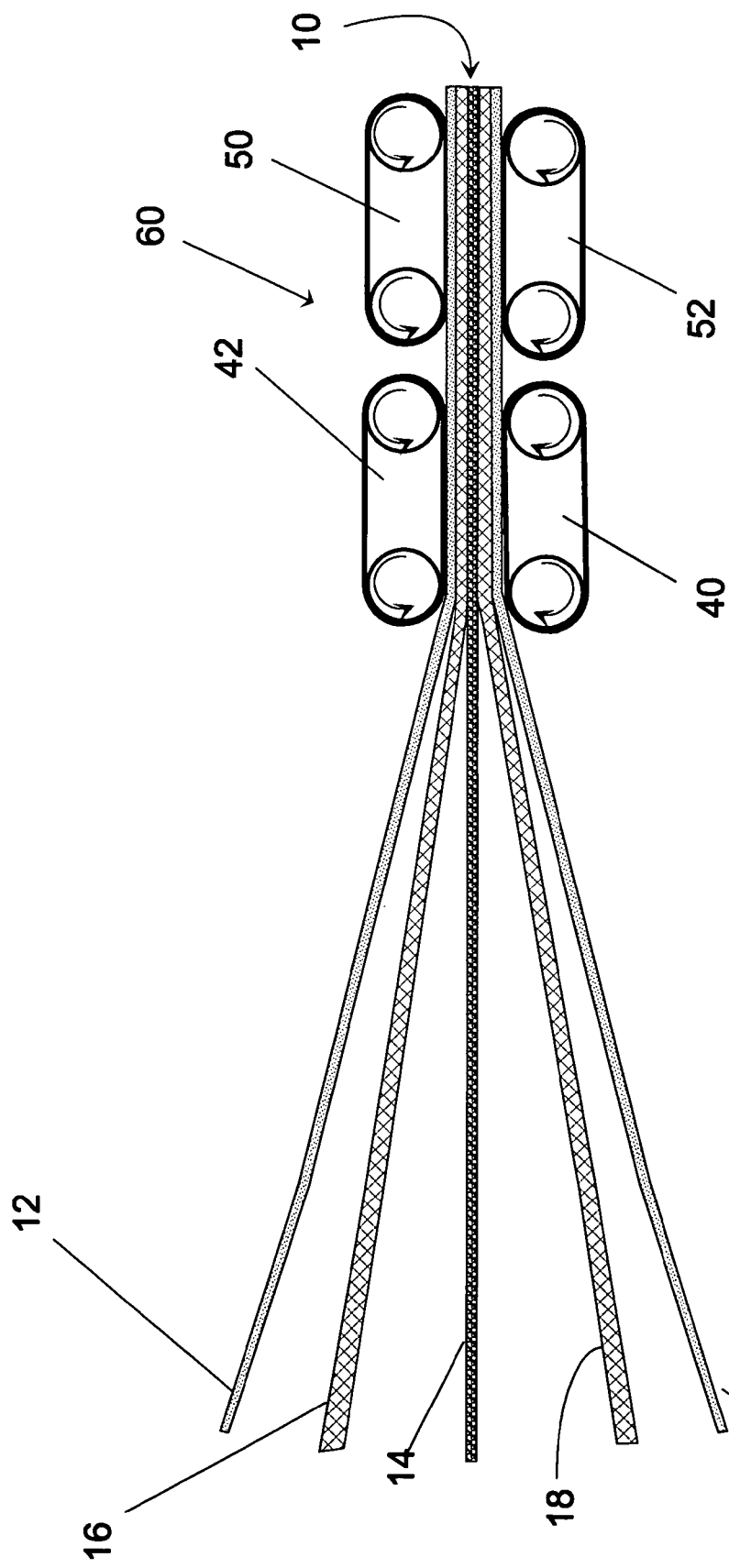
FIG. 1 illustrates the method of forming a multi-layer laminate that is fused and cooled using a double belt laminator.

The invention is a GMT laminate that following compression molding forms a GMT composite part with a Class-A surface, wherein the GMT part is suitable for applications as an exterior body panel. The body part can be either in-mold coated, or painted in subsequent steps for use in exterior body panel applications in the automotive and transportation markets. In addition to glass, the fibers can be selected from the group consisting of metal fibers, ceramic fibers, carbon fibers, natural fibers, synthetic polymer fibers made from polymers such as polyester, polypropylene, polyamides, polyimides, and polyurethanes, and blends and combinations thereof. The fiber reinforced laminate is comprised of: a) an extruded layer comprised of a cyclic polyester oligomer containing a latent polymerization catalyst; and b) a permeable layer of reinforcing fibers. Suitable examples of a latent polymerization catalyst are an organotin compound selected from group consisting of 1,1,6,6-tetra-n-butyl-1,6-distanna-2,5,7,10-tetraoxacyclodecane, n-butyltin(IV) chloride dihydroxide, dialkyltin(IV) oxides, such as di-n-butyltin(IV) oxide and di-n-octyltin oxide, and acyclic and cyclic monoalkyltin(IV) derivatives such as n-butyltin tri-n-butoxide, dialkyltin(IV) dialkoxides such as di-n-butyltin(IV) di-n-butoxide and 2,2-di-n-butyl-2-stanna-1,3-dioxacycloheptane, dibutyl tin dioxide, and trialkyltin alkoxides, such as tributyltin ethoxide, trisstannoxanes. Tin compounds are usually combined with a tertiary amine, such as trialkyl amine (i.e., tri-isopropyl amine, di-isopropyl ethylamine, triethylene diamine). Other suitable examples of a latent polymerization catalyst are an organotitanate compound selected from group consisting of tetra(2-ethylhexyl)titanate, tetraisopropyl titanate, tetrabutyl titanate, Di-1-butyl 2,2-dimethylpropane-1,3-dioxytitanate, Di-1-butyl 2,2-diethylpropane-1,3-doxytitanate, Di-1-butyl 2-(1-propyl)-2-methylproane-1,3-dioxytitanate, Di-1-butyl 2-ethylhexane-1,3-dioxytitante, Di-(2-ethyl-1-hexyl) 2,2-dimethylpropane-1,3-dioxytitanate, Di-(2-ethyl-1-hexyl) 2,2-diethylpropane-1,3-dioxytitanate, Di-(2-ethyl-1-hexyl) 2-(1-propyl)-2-methylpropane-1,3-dioxytitanate, Di-(2-ethyl-1-hexyl) 2-ethylhexane-1,3-dioxytitante, Di-(2-ethyl-1-hexyl) 2-(1-butyl)-2-ethylpropane-1,3-dioxytitante, Bis-(2,2-dimethyl-1,3-propylene)titanate, Bis-(2,2-diethyl-1,3-propylene)titanate, Bis-(2-(1-propyl)-2-methyl-1,3-propylene)titanate, Bis-(2-(1-butyl)-2-ethyl-1,3-propylene) titanate, Bis-(2-ethyl-1,3-hexylene)titanate, 1-(1-butoxy)-4-methyl-2,6,7-trioxa-1-titanabicyclo[2,2,2]octane, 1-(2-ethyl-1-hexoxy)-4-methyl-2,6,7-trioxa-1-titanabicyclo[2,2,2]octane, 1-(1-butoxy)-4-ethyl-2,6,7-trioxa-1-titanabicyclo-[2,2,2]octane, 1-(2-ethyl-1-hexoxy)-4-ethyl-2,6,7-trioxa-1-titanabicyclo [2,2,2]octane, 1-(2-propoxy)-4-ethyl-2,6,7-trioxa-1-titanabicyclo[2,2,2]octane, and similar multi-ring titanate compounds.

The composition can also contain reactive functional groups additives selected from the group consisting of plasticizers, monomers, dimers, trimers, tetramers and the like, or any combination thereof, wherein the reactive functional groups are selected from the group consisting of esters, epoxies, anhydrides, lactones, and blocked isocyanates.

The typical thickness range of the laminate is from about 2 mm to about 25 mm. The glass content is about 25% to 65%, with a more preferred composition of 40% to 57% by weight. A composite after molding can be comprised of more than one laminate, and typically, multiple laminates are combined for high strength applications. An approximately 6.5 mm laminate containing 42% glass weighs approximately 2000 grams per square meter. A similar weight laminate containing 55% glass is 8.35 mm. When molded the thickness of the 55% glass laminate can have a finished composite thickness of 2 to 11 mm, depending on the molding parameter, and the 42% glass laminate can have a finished composite thickness of 2 to 7 mm. The glass fibers can actually spring back giving a higher thickness and, unexpectedly, the higher content glass composite can produce a lower density composite. The composition of the core layer can be optimized to have maximum penetration of the glass mat, and generally speaking the composition of the core layer should have a high weight percent of the cyclic polyester oligomer. On the other hand, an extruded layer that is to have a Class-A surface is preferably resin rich, and the composition of the resin rich layer preferably has either a relatively higher weight percentage of a polyester polymer or a linear polyester oligomer or both. The coat weight of the extruded layers is adjusted to be sufficient to saturate the mat and provide a resin rich Class-A surface.

Figure 2:
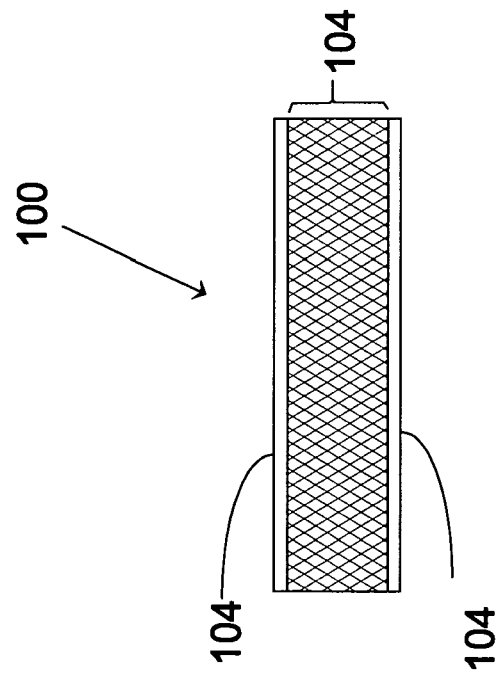
FIG. 2 illustrates the method of converting the laminate to a composite with a Class-A surface.
Figure 2:
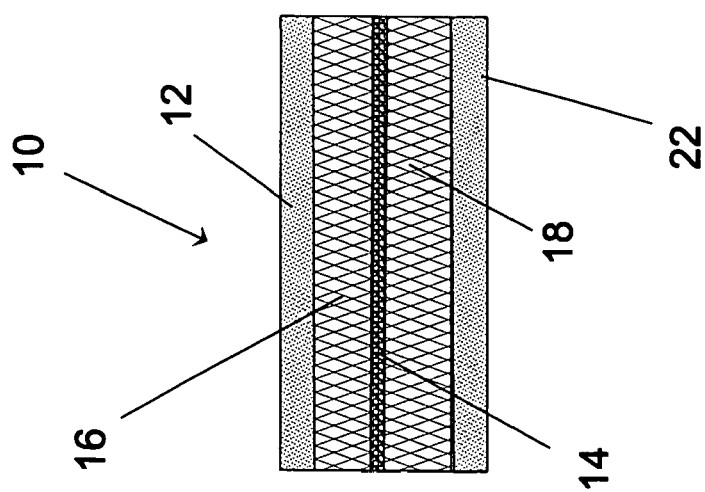

The composite having a Class-A surface is typically prepared from a multilayered laminate 10 comprised of a pair of outer layers (i.e., a first and a third layer) of extruded cyclic polyester oligomer containing a latent polymerization catalyst coated on two (i.e., a first and a second layer) permeable layers of reinforcing fibers, and a core (i.e., a second) layer of extruded cyclic polyester oligomer containing a latent polymerization catalyst. The laminate 10 is shown in FIG. 1. The laminate 10 is passed through a double belt laminator 60 to consolidate the layers. The core layer 14 of the cyclic polyester oligomer containing the latent polymerization catalyst and the two outer layers, 12 and 22, are extruded on the layers of glass fibrous mat, 16 and 18, as shown in FIG. 1. The glass fibrous mat is a permeable layer of reinforcing fibers. All of the layers are passed through a double belt laminator 60 consisting of belts, 42 and 40, to compress the resinous layers, 22, 14 and 12, into the permeable layers of reinforcing fibers, 16 and 18. A pair of cooling belts, 52 and 50, removes the heat and solidifies the extrudate to form the finished laminate 10. As shown in FIG. 2, under heat and pressure the glass mat laminate 10 fuses forming a composite 100 with a Class-A surface. The center 102 is comprised of the glass fibers integrally mixed with the polymerized cyclic polyester resin. The surface of the composite 100 has a resin rich surface 104 that is substantially comprised of the polymerized cyclic polyester resin admixed with polymerized linear polyester oligomers and polyester resin. Note, under heat and pressure, the core cyclic polyester oligomers containing the latent polymerization catalyst 14 have infused the permeable layers of reinforcing fibers. In the instant case, the cyclic polyester oligomers are polymerized via transesterification and ring opening. Suitable transesterification catalyst for polymerizing cyclic polyester oligomers are selected from the group consisting of organotin and organotitanate compounds.

In the presence of a polymerization agent, cyclic polyesters oligomers, and particularly macrocyclic oligoesters, can be rapidly polymerized by ring opening, forming substantially linear polyesters having a much higher molecular weight. Typical molecular weights are in the range from about 90,000 to in excess of 150,000. The reaction has a relatively low exotherm. Preferred macrocyclic oligoesters are macrocyclic oligoesters of 1,4-butylene terephthalate (CPBT), 1,3-propylene terephthalate (CPPT), 1,4-cyclohexylenedimethylene terephthalate (CPCT), ethylene terephthalate (CPET), and 1,2-ethylene 2,6-naphthalenedicarboxylate (CPEN). Macrocyclic multi-oligoesters are comprised of two or more of the above structural repeat units. The scope of the invention includes macrocyclic oligoesters of polyethylene isophthalate, sulfonated polyethylene isophthalate, sulfonated polyalkylene terephthalate, sulfonated polyalkylene naphthenate, sulfonated polyalkylene isophthalate and polycarbonates. As previously mentioned, monomers can be added, serving principally as diluents and also cross-linkers. Macrocyclic oligoesters can be blended to change the miscibility of the macrocyclic oligoester in a thermoplastic resin, and to change the melting point. Also, linear oligomers can be admixed with macrocyclic oligoesters to lower the melting point. The mixing of isophthlate esters to terephthalate esters significantly reduces the crystallinity of the polymerized material. The main advantage of macrocyclic oligoesters over their linear counterpart is that upon melting they have a very low viscosity. For instance, CPBT resins are solid (powder, pellet, flake) at room temperature and when heated are fully molten above 150° C. (300° F.), with a viscosity in the range of 150 mPa·s (150 cP), and drops in viscosity to below 20 mPa·s (20 cP) at 180° C. (355° F.). When mixed with specific tin or titanium polymerization catalysts the PBT macrocyclic oligoesters open and connect (i.e., polymerize) to form high molecular weight PBT thermoplastic without exotherm or off-gassing. Full polymerization can occur in 10's of seconds or many minutes depending on the temperature and type of catalyst used. The initial water-like viscosity enables the resin to migrate to the surface during B-stage processing. As a comparison of viscosity, polycarbonate having a MFI of 18-24 has a viscosity 40,000 mPa (40,000 cP) at 600° F., while CPBT has a viscosity of 5 mPa (5 cP). Typically, the polymerizable component layer has a significant percentage of polycarbonate to improve the filmic properties, wherein the polycarbonate can make up to 80% of the extruded polymerizable component layer.

An example of the invention is given in Example 1.

EXAMPLE 1

A 2.1 oz/sq. ft glass fiber mat is extrusion coated with a mixture of cyclic poly(1,4-butylene terephthalate) (CPBT) containing a latent polymerization catalyst (i.e., dibutyl tin dioxide cut in a plasticizer, dioctyl phthalate) and PET. The mixture is extruded at about 2 oz/sq. ft. A second glass fiber mat weighing 2.1 oz/sq. ft is similarly coated. Coextruded between the two mats is a core layer comprised of a blend of about 90% by weight CPBT and 10% by weight linear poly (1,4-butylene terephthalate oligomer. The total weight of the five layer laminate is about 16 oz/sq. ft.

The laminate is unified in a heated press with platen surface temperature measuring 180° C. (355° F.) for about 4 minutes. The platens are held at a constant gap of 3 mm. The fused laminate is transported to a cooling press and cooled to room temperature under pressure at a constant gap of 3 mm for about 4 minutes. The cooled fused laminate is then trimmed, sheared and sectioned into 8" square panels.

In B-stage processing, the fused laminate is heated in an IR oven to 600° F. for 120 seconds and thermoformed or compression molded in a heated tool held at 200° F. with a pressure of 2 tons/sq in. The resulting composite has a uniform middle of polymerized polyester and glass fiber. The composite has a Class-A surface with a tool surface finish.

SUMMARY OF THE ACHIEVEMENT OF THE OBJECTS OF THE INVENTION

From the foregoing, it is readily apparent that I have invented an improved method and composition for forming a fiber reinforced composite, wherein the surface of the composite has a Class-A surface. The composition employs a cyclic polyester oligomer, and in particular poly(1,4-butylene terephthalate), which can be extruded at much lower viscosities than are normally obtainable with traditional polyester resins. Penetration of the permeable layer of reinforcing fibers is far superior. The water-like viscosity allows rapid and excellent wet-out of fillers and fiber reinforcements along with the ability to mold at very low pressures. Demolding can take place quickly because the resulting polyester polymer solidifies rapidly. There is no need to cool the mold as within a particular temperature range CPBT resins melt, flow, polymerize, and then solidify sufficiently for part removal without cooling the mold. Also, there is substantially no heat released during the reaction that converts CPBT resins to a PBT thermoplastic material. This prevents the reaction from producing uncontrolled temperature increases, which can damage parts in the mold. Cycle times can be greatly reduced in large parts where thick walled sections currently pose a threat of burning unless processed slowly and carefully. Full polymerization can occur in 10's of seconds or many minutes depending on the temperature and type of catalyst used. The CPBT resins do not off-gas while processing, and this reduces the void content and promotes better surface finish. It is further apparent that the laminate, when processed in a compression mold produces manufactured parts that are suitable for use in exterior body panel applications in automotive and transportation markets.

What is claimed is:

1. A composition of a fiber reinforced laminate that, on processing with heat and compression, forms a composite with a substantially fiber free surface, said composition comprising:
   a) a first extruded layer comprised of a cyclic polyester oligomer containing a latent polymerization catalyst;
   b) a first permeable layer of reinforcing fibers;
   c) a polyester polymers, or a polycarbonate, or a blend thereof:
   wherein the latent polymerization catalyst is activated when exposed to temperatures in excess of 200° C., which initiates polymerization of the cyclic polyester oligomer therein forming a polymerized resin; and
   wherein, when processed at temperatures above 200° C., the cyclic polyester oligomer flows impregnating the permeable layer of reinforcing fibers, polymerizes, and forming the composite that has a substantially fiber free surface, wherein the cyclic polyester oligomer is selected from the group consisting of cyclic poly(1,4-butylene terephthalate) (CPBT), poly(1,3-propylene terephthalate) (CPPT), poly(1,4-cyclohexylenedimethylene terephthalate) (CPCT), poly(ethylene terephthalate) (CPET), poly(1,2-ethylene 2,6-naphthalenedicarboxylate) (CPEN), polycaprolactone (CPCL) oligomers, and copolyester oligomers comprising two or more of the above monomer repeat units, wherein the composition is further comprised of a linear polyester oligomer, or a polycarbonate oligomer, or a blend thereof.

2. The composition, as claimed in claim 1, wherein the cyclic polyester oligomer is substantially cyclic poly(1,4-butylene terephthalate).

3. The composition, as claimed in claim 2, wherein the linear polyester oligomer is substantially polycaprolactone (PCL).

4. The composition, as claimed in claim 3, wherein the permeable layer of reinforcing fibers is substantially a fiberglass mat.

5. The composition, as claimed in claim 4, wherein the latent polymerization catalyst is substantially dibutyl tin dioxide diluted in a plasticizer.

6. The composition, as claimed in claim 4, wherein the polymerized resin is a tere- polymer of polycaprolactone and poly(1,4-butylene terephthalate).

7. A composition of a fiber reinforced laminate that, on processing with heat and compression, forms a composite with a substantially fiber free surface, said composition comprising:
   a) a first extruded layer comprised of a cyclic polyester oligomer containing a latent polymerization catalyst;
   b) a first permeable layer of reinforcing fibers;
   c) wherein the composition is further comprised of reactive functional groups additives selected from the group consisting of monomers, dimers, trimers, tetramers, or any combination thereof, wherein the reactive functional groups are selected from the group consisting of esters, eposies, anhydrides, lactones and blocked isocyanates;
   wherein the latent polymerization catalyst is activated when exposed to temperatures in excess of 200° C., which initiates polymerization of the cyclic polyester oligomer therein forming apolymerized resin; and,
   wherein, when processed at temperatures above 200° C., the cyclic polyester oligomer flows impregnating the permeable layer of reinforcing fibers, polymerizes, and forming the composite that has a substantially fiber free surface.

8. A composition of a fiber reinforced laminate, wherein upon processing, with heat and compression, forms a composite with a substantially fiber free surface, said composition comprising:
   a) at least two extruded layers comprised of a cyclic polyester oligomer containing a latent polymerization catalyst;
   b) at least two permeable layers of reinforcing fibers;
   c) further comprised of reactive functional groups additives selected from the group consisting of plasticizers, monomers, dimers, trimers, tetramers, or any combination thereof, wherein the reactive functional groups are slected from the group consisting of esters, epoxies, anhydrides, lactones and blocked isocyanates;
   wherein the latent polymerization catalyst is activated when exposed to temperatures in excess of 200° C.; and
   wherein, when processed at temperatures above 200° C., the cyclis polyester oligomer flows impregnating the permeable layer of reinforcing fibers, polymerizes, and forming the composite that has a substantially fiber free surface.

9. A composition according to claim 8, wherein the composition is further comprised of additives selected from the group consisting of extenders which are fillers, antioxidants, UV stabilizers, thermal stabilizers, flame retardants, desiccants, buffers, antimicrobials, fillers which are reinforcing, glass beads, colorants, antimicrobial agents, dyes, bluing agents, fluorescing agents, pigments, plasticizers, oils, impact modifiers, processing aides selected for the group consisting of waxes, fluorinated compounds, silicone compounds, surfactants, polymeric processing aides, density modifiers, such as phenolic beads and micro-balloons, crushed stone, fumed silica, titanium dioxide, calcium carbonate, fly ash, talc, clay, carbon blacks, graphite, barium sulfate, quartz, and IR absorbent compounds to facilitate heating including metal oxides.

* * * * *